US012585846B2

(12) United States Patent
Belfort et al.

(10) Patent No.: US 12,585,846 B2
(45) Date of Patent: Mar. 24, 2026

(54) DIRECTED EVOLUTION FOR MEMBRANE DEVELOPMENT IN THREE DIMENSIONS

(71) Applicant: Rensselaer Polytechnic Institute, Troy, MI (US)

(72) Inventors: Georges Belfort, Slingerlands, NY (US); Joel L. Plawsky, Albany, NY (US); Mirco Sorci, Troy, NY (US); Chenyu Guan, Troy, MI (US)

(73) Assignee: Rensselaer Polytechnic Institute, Troy, NY (US)

( * ) Notice: Subject to any disclaimer, the term of this patent is extended or adjusted under 35 U.S.C. 154(b) by 1161 days.

(21) Appl. No.: 17/530,643

(22) Filed: Nov. 19, 2021

(65) Prior Publication Data

US 2022/0156437 A1     May 19, 2022

Related U.S. Application Data

(60) Provisional application No. 63/116,136, filed on Nov. 19, 2020.

(51) Int. Cl.
| | |
|---|---|
| *G06F 30/25* | (2020.01) |
| *B01D 61/00* | (2006.01) |
| *B01D 67/00* | (2006.01) |
| *G06F 30/28* | (2020.01) |
| *G06F 113/08* | (2020.01) |

(52) U.S. Cl.
CPC ............. *G06F 30/25* (2020.01); *B01D 61/00* (2013.01); *B01D 67/0093* (2013.01); *G06F 30/28* (2020.01); *G06F 2113/08* (2020.01)

(58) Field of Classification Search
None
See application file for complete search history.

(56) References Cited

U.S. PATENT DOCUMENTS

| | | |
|---|---|---|
| 6,844,028 B2 | 1/2005 | Mao |
| 8,335,671 B2 | 12/2012 | Engl et al. |
| 9,248,406 B2 | 2/2016 | Subbiah et al. |
| 9,610,541 B2 | 4/2017 | Hodgkinson et al. |
| 10,354,018 B2 | 7/2019 | Savage et al. |
| 2005/0272100 A1 | 12/2005 | Karlin |
| 2015/0165389 A1 | 6/2015 | McGinniss et al. |

FOREIGN PATENT DOCUMENTS

| | | |
|---|---|---|
| CN | 108573525 A | 8/2022 |
| WO | 2010109265 A1 | 9/2010 |
| WO | 2014204291 A1 | 12/2014 |

OTHER PUBLICATIONS

Alqaheem et al. Membranes (2020) vol. 10/33:36 pages.*
Benitez et al. The R Journal (2017) vol. 9/2:291-308.*

* cited by examiner

*Primary Examiner* — Lori A. Clow
(74) *Attorney, Agent, or Firm* — Barclay Damon LLP; Anthony P. Gangemi

(57) ABSTRACT

A method of directed evolution for developing a membrane includes using a 3D protocol to simulate particle trajectories and determine the effect of intermolecular forces on particle capture performance during membrane filtration to determine the effectiveness of different candidate membranes in optimizing performance.

20 Claims, 9 Drawing Sheets

DIRECTED EVOLUTION FOR MEMBRANE DEVELOPMENT IN THREE DIMENSIONS

CROSS REFERENCE TO RELATED APPLICATION(S)

This application claims the benefit of U.S. Provisional Patent Application No. 63/116,136, filed Nov. 19, 2020, which is incorporated by reference as if disclosed herein in its entirety.

FIELD

The present technology generally relates to the area of particle-capture membranes. More particularly, the present technology relates to optimizing membrane development based on simulated performance experiments.

BACKGROUND

Improving selectivity between different particles during membrane microfiltration has been a seminal goal for the past 100 years since Sartorius commercialized the first synthetic microporous membranes in Germany. Non-thermal separation processes, such as synthetic membrane filtration, are gaining inordinate attention due to their low energy requirements, modular construction, ease of scaleup, good separation performance and low relative cost. Membrane filtration is now the technology of choice for desalination of sea water for potable use. It is also widely used in food processing and for the bioprocessing of biologics in the biotechnology industry.

A majority of current porous membranes for liquid filtration are synthesized from polymers using the phase inversion ("PI") method. In this process, on addition of sufficient non-solvent, a homogeneous mixture of polymer and solvent forms 2 phases after passing through the binodal curve and subsequently forms a polymer membrane. This type of membrane is primarily characterized by pore-related properties (i.e. morphology, pore size, pore size distribution ("PSD")), which are significant in determining the filtration performance (i.e. selectivity and capacity) of the membrane. On the other hand, the mechanism of pore formation in the PI process is poorly understood due to its statistical nature, and clear guidelines for synthesizing membranes with desirable PSDs are absent. Commercially, these PI formed membranes are optimized empirically, in a time and money consuming process. Thus, either the mechanism of PI needs to be better understood in detail, or the process should be replaced with a more tractable one that allows "structure-by-design." To replace PI, alternative methods to synthesize membranes that enable structure-by-design and tools to determine the efficiency of separations for different candidate structures are needed.

Previous work by the present researchers proposed a reverse method to design membranes using a tool to determine performance. It adopted real commercial membrane cross-section to simulate particle in-depth trajectory inside membrane via the combination of fluid-particle interpolation, particle-particle and particle-membrane interactions using the DLVO theory. The simulation results agreed qualitatively with the Scanning Electron Microscope ("SEM") images and Energy Dispersive X-ray Spectroscopy ("EDS") measurements of particle deposition after filtration. However, this work used two-dimensional ("2D") flow profiles, points as particles and tracked the movement of these imaginary particles as they are dragged by the flowing fluid inside membrane. This approach may not reflect the actual conditions of particle drag and capture due to transverse flow within a real three-dimensional ("3D") membrane and to the missing of particle volume.

SUMMARY

Accordingly, some embodiments of the present technology are directed to a continuation of the recent approach of the present researchers of linking membrane microstructure with filtration performance. While the prior approach used 2D computational fluid and particle drag mechanics with particle and membrane force measurement described by classical DLVO theory in aqueous solutions, embodiments of the present technology extend the simulations to 3D using a fluid mechanics simulation program for 3D particle fluid dynamics called Multiphase Flow with Interphase Exchanges ("MFiX"), and adapt the extended-DLVO ("xDLVO") theory to model the behavior of the plethora of intermolecular force-distance curves between membranes (e.g., modified poly(ether sulfone) ("mPES")) and polystyrene particles coated with covalently attached streptavidin at different pH values and salt concentrations. In some embodiments, these intermolecular force-distance measurements (including short-term attraction) were obtained using atomic force microscopy ("AFM") in force mode.

In some embodiments, 3D simulations were performed using MFiX. In these simulations, actual 3D particles were defined with volume and mass, both thermodynamics (i.e. intermolecular forces) and hydrodynamics (i.e. drag force) effects on the particle capture were considered. In addition, the most recent and well-recognized xDLVO theory, along with AFM force measurements were adopted to characterize interactions between streptavidin coated particles and modified poly (ether sulfone) membranes. Hydrodynamic factors such as drag force and particle collisions due to fluid transport were incorporated into the simulation by the discrete element method ("MFiX-DEM").

The simulation results of particle capture efficiency qualitatively correlated with the magnitude of the short-term attractive forces with a model membrane internal structure comprising an array of spheres. Thus, stronger attractive forces lead to higher particle capture. It was also demonstrated that the xDLVO theory describes these jump-in attractive forces, given the solution conditions and net charge on the particle.

An object of the present technology is to establish a 3D protocol to simulate particle trajectories and determine the effect of intermolecular forces on particle capture performance during membrane filtration with the aim of determining the effectiveness of different candidate membranes in optimizing performance.

According to an exemplary embodiment of the present technology, a method of directed evolution for developing a membrane is provided. The method includes the steps of: providing an initial membrane including a structure configured to at least partially capture particles flowing therethrough; modeling a first in-silico three-dimensional membrane based on the initial membrane; modifying the first in-silico three-dimensional membrane to form a second in-silico three-dimensional membrane, the structure of the second in-silico three-dimensional membrane being different than the structure of the first in-silico three-dimensional membrane; simulating a flow of a first plurality of particles dispersed in a first fluid through the second in-silico three-dimensional membrane; obtaining a first set of intermolecular force-distance curve measurements between the first plurality of particles and the second in-silico three-dimensional membrane; simulating a flow of a second plurality of particles dispersed in a second fluid through the second in-silico three-dimensional membrane; obtaining a second set of intermolecular force-distance curve measurements between the second plurality of particles and the second in-silico three-dimensional membrane; comparing the first set of intermolecular force-distance curve measurements and the second set of intermolecular force-distance curve measurements; determining if the second in-silico three-dimensional membrane is optimized for an intended purpose; repeating the above steps, if the second in-silico three-dimensional membrane is determined to not be optimized for the intended purpose, to develop an optimized three-dimensional membrane; and forming, if the second in-silico three-dimensional membrane is determined to be optimized for the intended purpose, an evolved membrane based on the second in-silico three-dimensional membrane.

In some embodiments, the method further includes the steps of: simulating a flow of a third plurality of particles dispersed in a third fluid through the second in-silico three-dimensional membrane; obtaining a third set of intermolecular force-distance curve measurements between the third plurality of particles and the second in-silico three-dimensional membrane; and comparing the first set of intermolecular force-distance curve measurements, the second set of intermolecular force-distance curve measurements, and the third set of intermolecular force-distance curve measurements.

In some embodiments, the first fluid and the second fluid have different fluid medium conditions. In some embodiments, the different fluid medium conditions include at least one of pH concentration and salt concentration.

In some embodiments, the intermolecular force-distance curve measurements are obtained using atomic force microscopy in force mode.

In some embodiments, the intermolecular force-distance curve measurements includes the short-term attractive force between the respective first and second pluralities of particles and the second in-silico three-dimensional membrane.

In some embodiments, the step of comparing the first and second sets of intermolecular force-distance curve measurements includes fitting the respective intermolecular force-distance curve measurements to the extended-DLVO theory to model the behavior of the respective first and second pluralities of particles between the second in-silico three-dimensional membrane.

In some embodiments, hydrodynamics factors are kept constant.

In some embodiments, the method further includes the step of varying at least one hydrodynamics factor to evaluation how control parameters affect particle capture within the second in-silico three-dimensional membrane. In some embodiments, the at least one hydrodynamics factor includes at least one of drag force, particle collisions, approach fluid velocity, transmembrane pressure, and initial particle volume fraction.

In some embodiments, the second in-silico three-dimensional membrane includes a spherical bead membrane having a particle release region, an exit region, a particle capture region positioned between the particle release region and the exit region, and a plurality of spheres positioned within the particle capture region. In some embodiments, each of the plurality of spheres has a diameter of 200 μm and a 50 μm gap between each adjacent sphere. In some embodiments, the spherical bead membrane has a width of 1640 μm, a height of 1440 μm, and a thickness of 80 μm. In some embodiments, each of the first and second pluralities of particles has a diameter of 20 μm.

In some embodiments, at least one of the first and second pluralities of particles includes polystyrene particles coated with covalently attached streptavidin.

In some embodiments, the second in-silico three-dimensional membrane comprises a modified polyethersulfone material.

In some embodiments, the step of forming an evolved membrane includes modifying the structure of the initial membrane.

Further objects, aspects, features, and embodiments of the present technology will be apparent from the drawing figures and below description.

BRIEF DESCRIPTION OF DRAWINGS

FIG. 2 is a chart showing a representative intermolecular force curve with jump-in.

DETAILED DESCRIPTION

AFM-FM Force Measurements. In some embodiments, intermolecular forces between the mPES membrane surface and SA coated-polystyrene particles (referred to as SA-particles) were measured using AFM-FM under 9 different pH and salt concentration conditions (pH=4, 5, 7.4; Salt concentration (SC)=1, 10, 100 mM), all experiments are labeled from A to I, details are summarized in Table 1 below.

TABLE 1

| Labels for experimental setups | | | |
| --- | --- | --- | --- |
| | SC = 1 mM | SC = 10 mM | SC = 100 mM |
| pH = 4 | A | D | G |
| pH = 5 | B | E | H |
| pH = 7.4 | C | F | I |

Figure 1:
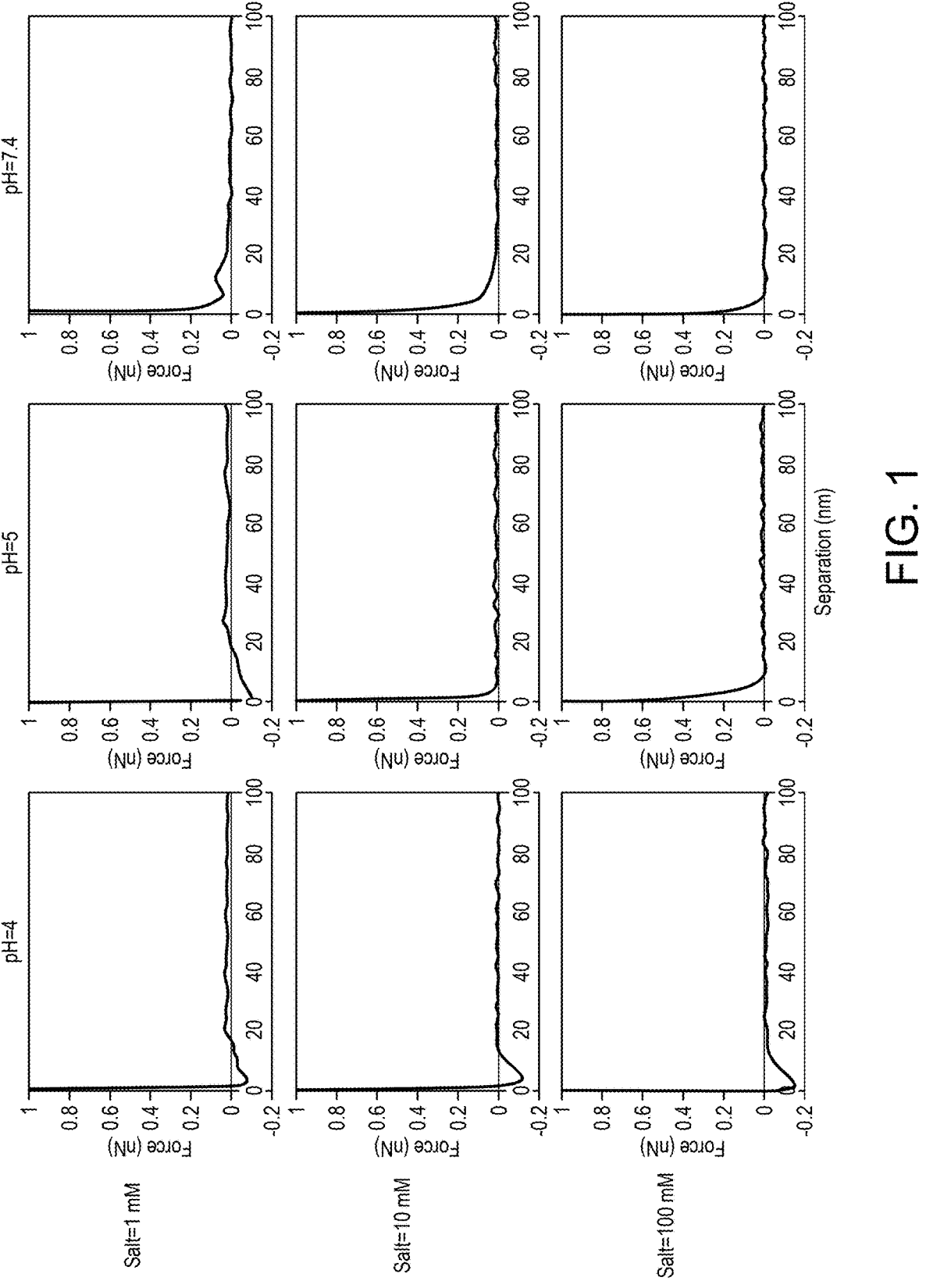
FIG. 1 is a chart showing the comparison of intermolecular force curves according to exemplary simulation experiments of the present technology.
Figure 2:
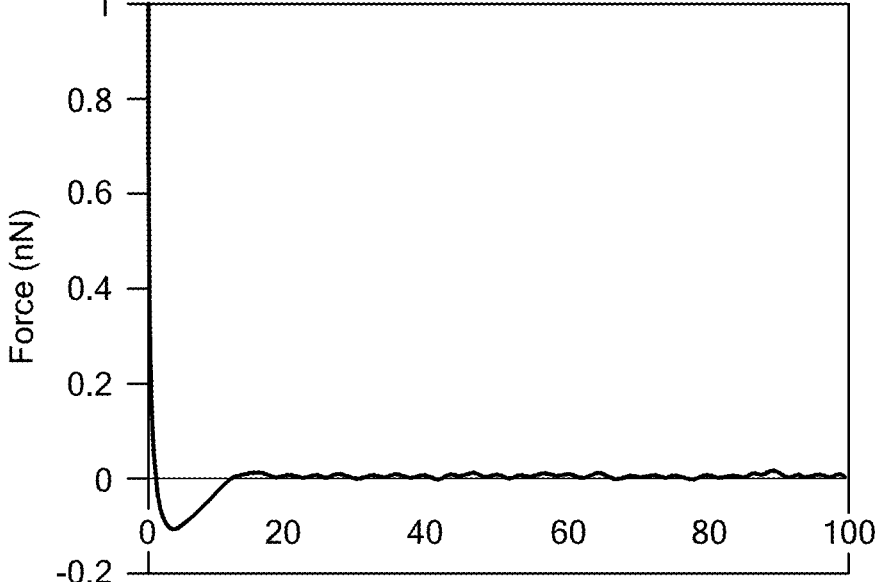

For each experiment, force curves were obtained by plotting intermolecular forces against separation distances when the AFM tip is moved toward the membrane before touching the surface, as shown in FIG. 1. As seen in a typical AFM force curve with jump-in (FIG. 2), as SA-particle moves toward the membrane, at relatively short distances, the SA-particle is "dragged" to the membrane surface due to an short-term attractive ($F_{Atr}$) force (this attraction is called "jump-in"), followed by a strong repulsion. The magnitude of this attraction is key, in some embodiments, in determining the thermodynamic effect of SA-particle flow in a membrane. It is primarily driven by the attractive van der Waals and electrostatic (if attractive) forces. The strong repulsion following the attraction is ascribed firstly to typical electrostatic repulsion, which spans from several nanometer to as long as 100 nm, and secondly to the strong AB repulsive force, whose magnitude can be at least twice as high as the van der Waals and electrostatic forces in small separation distances (i.e. D<3 nm).

Figure 3:
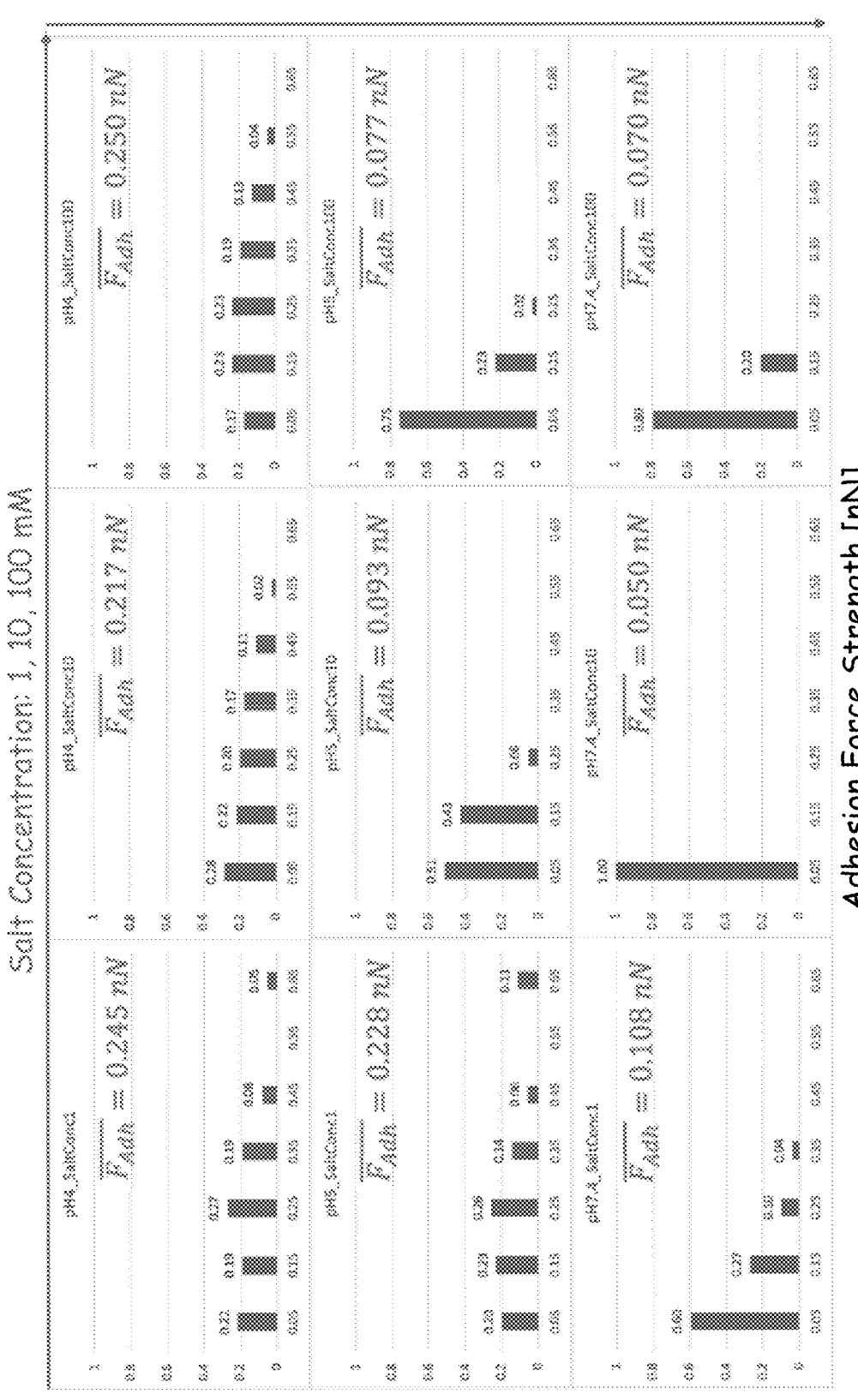
FIG. 3 is a chart showing the comparison of short-term attraction (adhesion) distribution histogram according to exemplary simulation experiments of the present technology.
Figure 4:
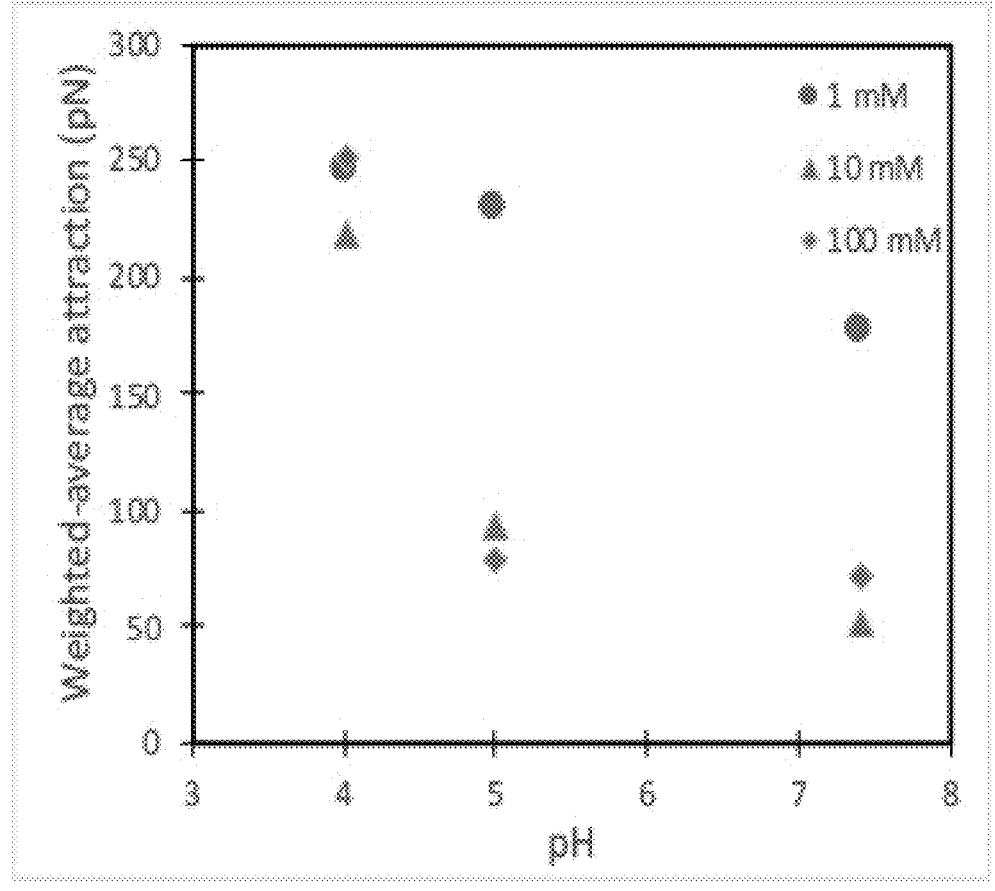
FIG. 4 is a chart showing the effect of pH and salt concentrations on weighted-average attractive force according to exemplary simulation experiments of the present technology.

In some embodiments, the magnitude of this short-term attractive force during approach and jump-in is a good index of the strength of the thermodynamic interactions between two approaching surfaces and naturally becomes the focus of the "thermodynamics effect." Keeping the trigger force constant, each experiment evaluated 40 force curves in a force map with a focus on the magnitude of the short-term attraction. By evenly distributing the 40 samples to 7 categories according to the attractive force magnitude (i.e. <50, 50-150, 150-250, 250-350, 350-450, 450-550, 550-650 pN) and calculating the frequency of occurrence for each, the short-term attraction force (also referred to herein as the adhesion force) distribution histograms were obtained, as shown in FIG. 3. The results show that as pH and salt concentration increases, the adhesion force distributions shift to the left (except at the lowest pH), indicating decreased magnitude of adhesion forces. The product of the short-term attractive force and its frequency of each category yields the weighted-average adhesion force $\overline{F_{Adh}}$. Replotting the weighted-average attractive force (in pN) of each pH and salt concentration condition, the short-term attractive force variation can be seen in a more straightforward way. For example, as shown in FIG. 4, $\overline{F_{Adh}}$ decreased as pH increases for all three salt conditions (i.e. 1, 10, and 100 mM).

The difference of the short-term attraction force with different pH and salt concentration conditions may be explained as follows. First, a polarity change on the surface as the pH is decreased to 4, the SA coated-particle (4<isoelectric point ("pI")<5) surface potential flipped from negative to positive, while the mPES membrane (pI<4) surface potential remained negative. Hence, the electrostatic force becomes attractive and contributes to short-term attraction. Second, the magnitude change of the surface potentials resulting from the increase of both pH and salt concentration causes higher magnitude values of the surface potentials, $\psi_1$ and $\psi_2$, rendering the mostly repulsive electrostatic forces more intense and, thus, repelling SA-particles from mPES membrane. Third, increasing the salt concentration reduces the Debye length, which originates from the electron charge screening effect. Hence, the higher salt concentration induces a thinner charged double-layer (Debye length) and reduces the effective range of electrostatic repulsive forces. Fourth, the hydrophilicity of the membrane surface and disturbance of the interfacial water structure caused by the pH and salt concentration change will have an impact on the overall attractive force by influencing the Lewis acid-base ("AB") force as well.

Figure 5:
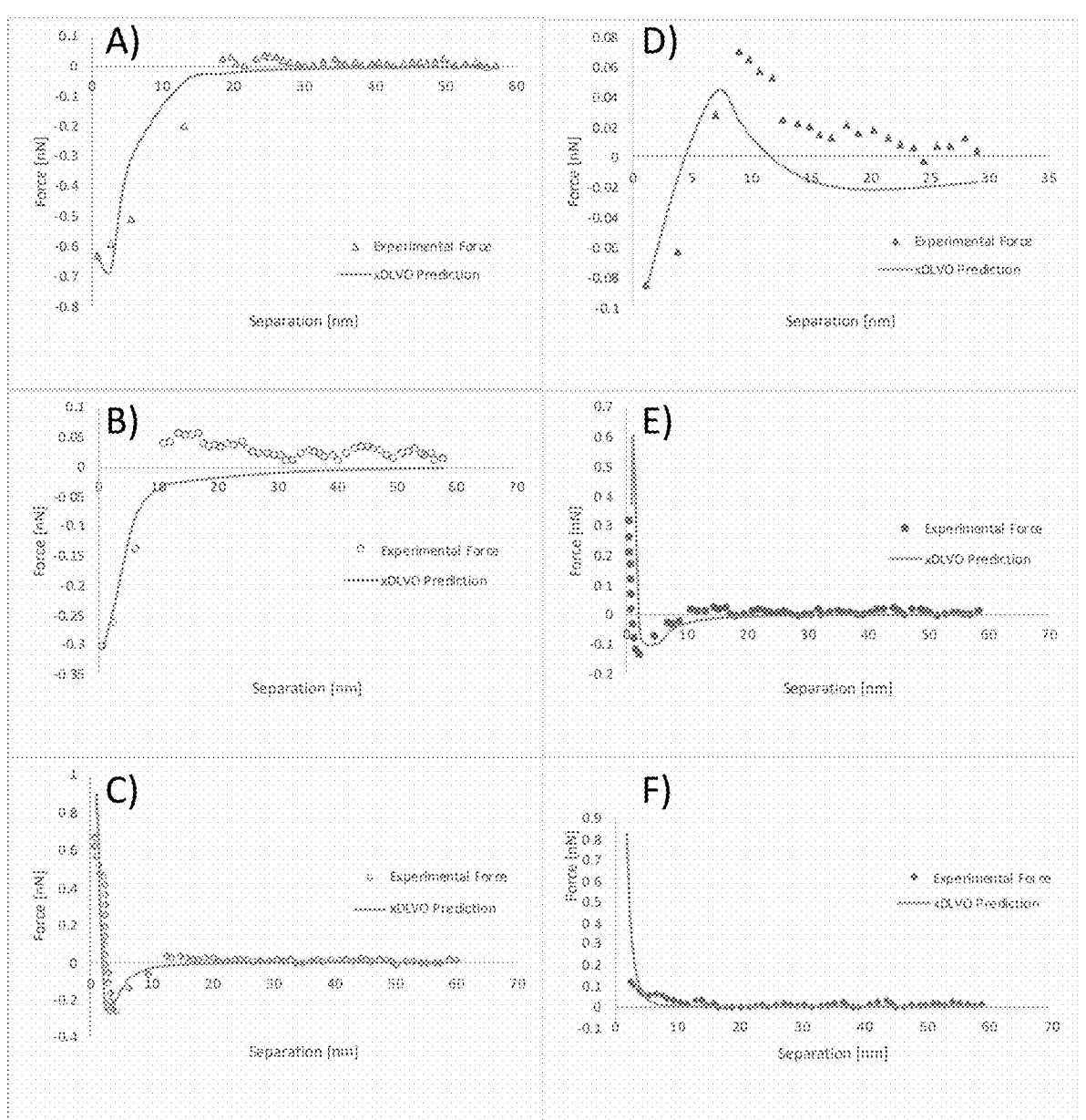
FIG. 5 is a chart showing the comparison of fitting the xDLVO theory to measured force curves according to exemplary simulation experiments of the present technology.

Fitting xDLVO Theory. Due to the difficulty of measuring surface potentials of SA-particles when the salt concentration is as high as 100 mM, xDLVO theory fitting is only applied to force curves measured under salt concentrations being 1 and 10 mM, with all ranges of pH variation covered. In some embodiments, the force data were fitted by the xDLVO theory for each experiment from A to F in Table 1 and are shown in FIG. 5. Four independent fitting parameters ($\psi_{membrane}$, $\psi_{particle}$, A and $\Delta G_{plm}^{AB}$) and the Debye length $\kappa^{-1}$ calculated via Eq. 6 (as discussed below) are presented in Table 2 below.

TABLE 2

| | | Parameters obtained from fitting the xDLVO to experimental force curves | | | |
|---|---|---|---|---|---|
| Label[a] | $\kappa^{-1}$ (nm) | $\psi_{membrane}$ (mV) | $\psi_{particle}$ (mV) | A ($\times 10^{-21}$ J) | $\Delta G_{plm}^{AB}\left(\frac{mJ}{m^2}\right)$ |
| A | 9.615 | −23 | 5 | 46.2 | 6.0 |
| B | 9.615 | −20 | −28 | 68.8 | 6.9 |
| C | 9.615 | −30 | −43 | 18.8 | 3.0 |
| D | 3.049 | −15 | 13 | 116.6 | 8.12 |
| E | 3.049 | −13 | −13 | 18.4 | 2.0 |
| F | 3.049 | −17 | −22 | 0.9 | 1.2 |

[a]See Table 1

The Hamaker constant A extracted from fitting the experiment force curves ranges from A=$0.1\times10^{-21}$ J to A=$11.6\times10^{-20}$ J, most values lie in the range of Hamaker constant for typical condensed phases (i.e. $(1.0\text{-}40.0)\times10^{-20}$ J). For example, polystyrene-polystyrene interaction in water has a Hamaker constant A=$1.4\times10^{-20}$ J.

Figure 7:
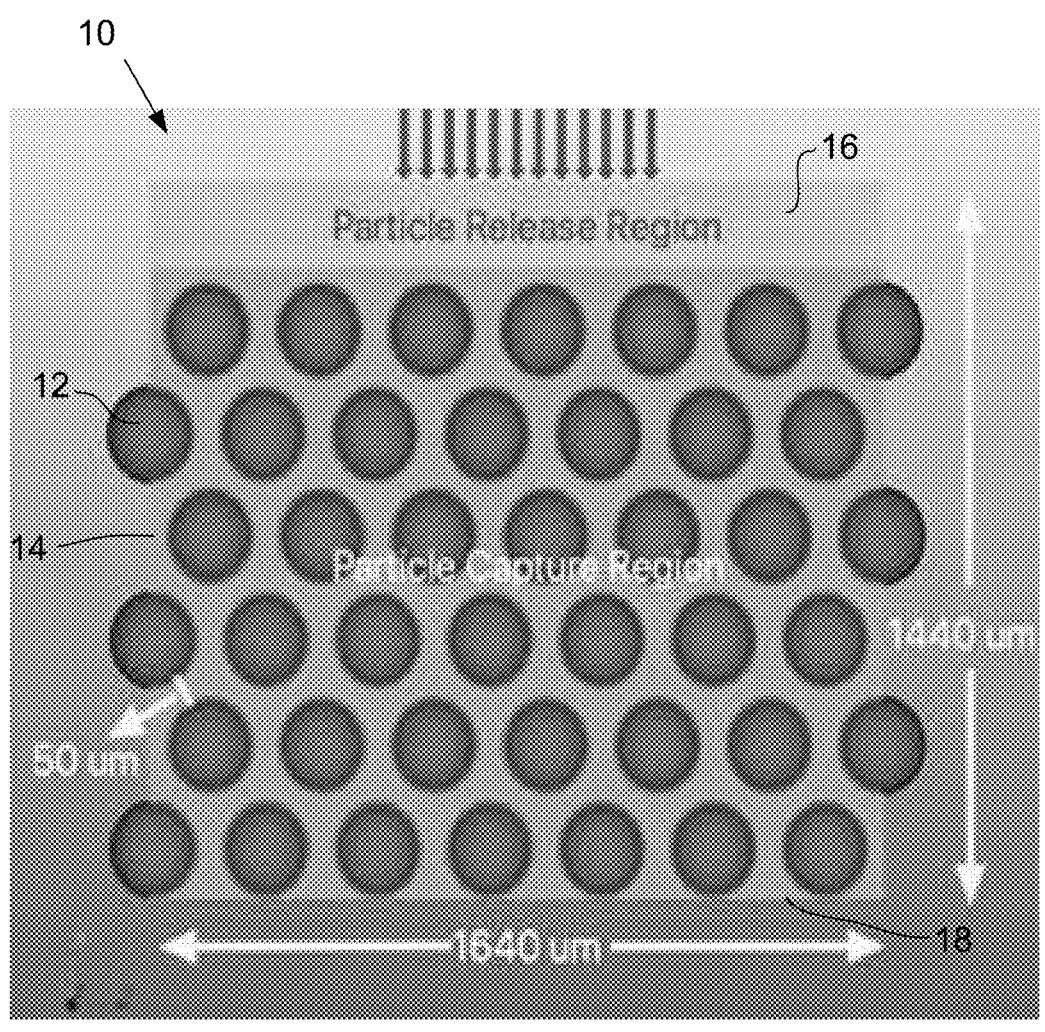
FIG. 7 is a front view of a simulated membrane model according to an exemplary embodiment of the present technology.
Figure 8:
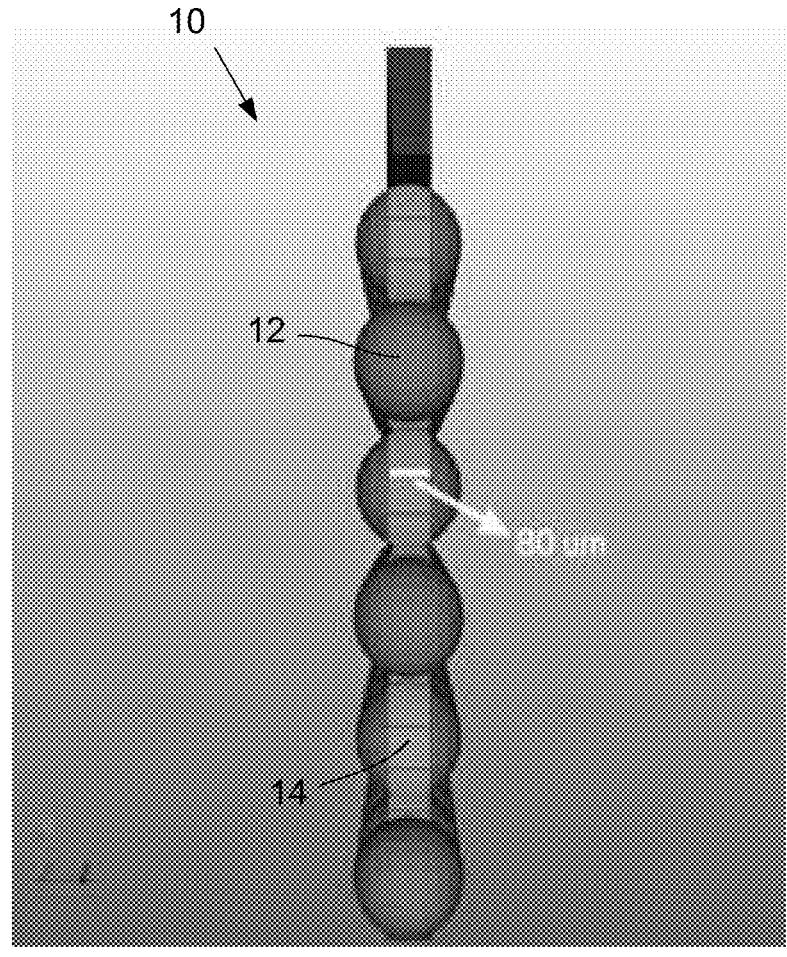
FIG. 8 is a side view of the simulated membrane model of FIG. 7.

3D Computational Simulation. In some embodiments, parameters listed in Table 2 were implemented into the MFiX program in order to account for the intermolecular forces between the mPES membrane and the SA-particles flowing into the model spherical bead membrane, as shown in FIGS. 7-8. Keeping all the hydrodynamics-related parameters constant, such as an approach fluid velocity of V=5 mm/s for all experiments, the initial particle volume fraction (total particle number) was $\varepsilon_p$=0.1 and the transmembrane pressure was set at $\Delta P$=1 bar. A major goal of the simulation, according to one embodiment, was to determine the effect of varying the intermolecular forces between the model beads in the membrane and model particles with mPES-AS-particle properties, i.e. the thermodynamic effect (short-term attraction) on particle capture.

Figure 6:
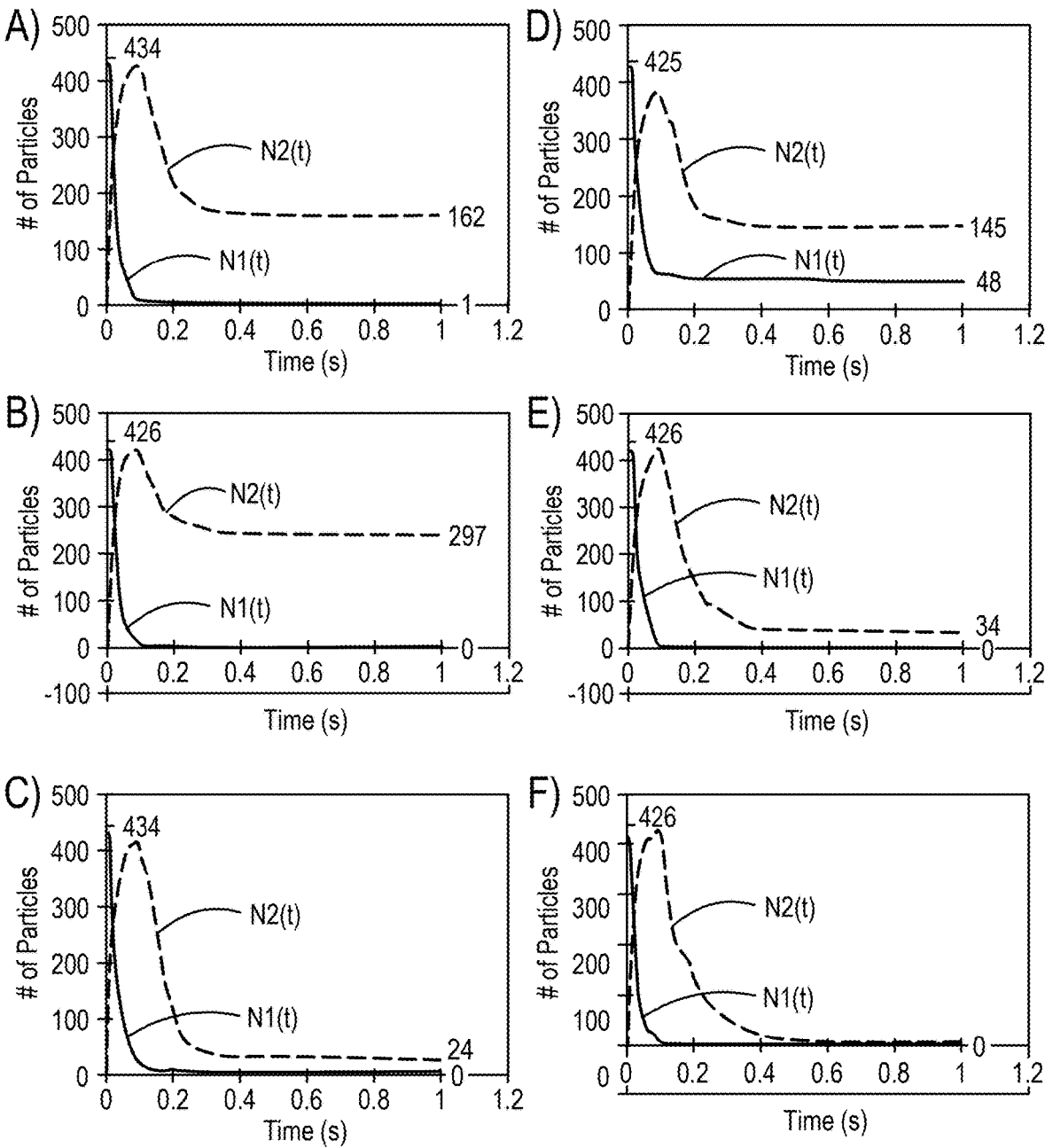
FIG. 6 is a chart showing the comparison of particle number evolution in the particle release region and particle capture region of a 3D membrane according to exemplary simulation experiments of the present technology.

Real-time monitoring of particle number in the particle release region ($N_1(t)$) and particle capture region ($N_2(t)$) provides a comparison of particle capture performance under different conditions, as depicted in FIG. 6. As particles flowed from the top to the bottom, $N_1(t)$ constantly decreased as simulation proceeded. In some embodiments, the reason why $N_1(t=1)=7$, where t=1 was the end of the run, instead of 0, is that some particles immediately agglomerated at the beginning of the simulation, and size of the aggregates were too large to enter the pores. The orange line labeled $N_2(t)$ reveals how many particles were in the particle capture region as a function of time. This line first grew to a peak as particles flooded in, some of which immediately left the system through the bottom, while some were captured by the membrane, leaving a flat curve as $N_2(t=1)$.

Since the total number of particles was initially fixed as $N_1$ (t=0), by defining the particle capture efficiency $$e = \frac{N_1(t=1) + N_2(t=1)}{N_1(t=0)},$$

7 a clear quantitative understanding on particle capture differences for different conditions is obtained (see Table 3 below). The assumption underlying this definition that at t=1 s all particles have reached equilibrium (i.e. all particles remaining in the system were captured without flowing) was confirmed from the simulation animation. To emphasize the particle capture that solely takes place inside membrane internal structure, another parameter $$p = 1 - \frac{N_2(t = 1)}{N_1(t = 0) - N_1(t = 1)}$$

was defined, where the numerator is the number of particles captured in the particle capture region, and the denominator indicates how many particles passed into this region.

Particle capture efficiency e was calculated at the end of simulation after 1 s and is listed with the weighted-average short-term attractive force $F_{A_{tr}}$ measured by AFM-FM for comparison in Table 3 below. Overall, the magnitude of $F_{A_{tr}}$ is consistent with the particle capture efficiency under the current constant hydrodynamics conditions. Specifically, the stronger the short-term attractive force, the more likely the higher particle capture efficiency will occur. This confirms qualitatively that this simulation protocol can be used for investigating the role of membrane structure for particle capture performance.

TABLE 3

Comparison of short-term attractive force and particle capture efficiency

| Label [a] | Condition | Averaged $F_{A_{tr}}$ (pN) | e[b] | p[c] |
|---|---|---|---|---|
| A | pH4_SC1 | 245 | 0.39 | 0.61 |
| B | pH5_SC1 | 228 | 0.56 | 0.44 |
| C | pH7.4_SC1 | 175 | 0.06 | 0.94 |
| D | pH4_SC10 | 217 | 0.45 | 0.62 |
| E | pH5_SC10 | 93 | 0.08 | 0.92 |
| F | pH7.4_SC10 | 50 | 0.007 | 0.993 |

[a] See Table 3.1 for label list.

$$^b e = \frac{N_1(t = 1) + N_2(t = 1)}{N_1(t = 0)}.$$

$$^c p = 1 - \frac{N_2(t = 1)}{N_1(t = 0) - N_1(t = 1)}.$$

Methods

In some embodiments, modified 0.2 μm hydrophilic poly (ether sulfone) ("mPES") membranes were obtained through surface chemistry treatment. Streptavidin coated 1.0-1.4 μm polystyrene particles, 1.0% w/v in H₂O have been used in zeta potential measurements. Streptavidin coated 1.0 μm polystyrene particle on a silicon nitride cantilever with a 0.06 N/m spring constant were used for AFM particle-membrane interaction measurement.

In some embodiments, MFiX was used to accommodate the discrete element method ("MFiX-DEM") and consider both thermodynamics and hydrodynamics effects for the 3D fluid-solid simulation.

Atomic Force Microscopy in Force Mode ("AFM-FM"). In some embodiments, atomic force microscopy in force mapping mode was used to carry out all intermolecular force measurement experiments, along with the use a scientific data analysis software (e.g., IGOR Pro 6) for data analysis. A silicon nitride cantilever whose normal spring constant is 60 pN/nm and having a 1 μm particle attached on it was moved toward the membrane with constant trigger force applied. Each measurement will generate a force map with 400 force curves represented in a 20×20 array whose area is 20×20 μm², which means every pixel point on the force map has a length of 1 μm in both X and Y directions. Difference in this experiment series comes from the buffer solutions where the interaction was measured (i.e. pH=4, 5, 7.4; Salt concentration (SC)=1, 10, 100 mM). All measurements were undertaken at 22° C.

Zeta Potential Measurement. Zeta potential measured under streaming potential and/or streaming current mode using an electrokinetic analyzer approximates the surface potential of particles and membranes. In some embodiments, membrane samples were fixed on the rectangular planar sample holders of the electrokinetic analyzer's adjustable gap cell using double-sided adhesive tape. Each sample must be rinsed 5 times with the working electrolyte solution before loading into the analyzer. All measurements were performed at 22° C. with the gap distance kept in consistence as ~100 μm.

xDLVO Theory. The classic DLVO theory, named after Derjaguin, Landau, Verwey, and Overbeek, is traditionally used to represent the interaction between colloids and surfaces. However, recent work has shown that it is incapable of describing colloid-surface (i.e. membrane) interactions especially when the separation is small (~5 nm). In addition to van der Waals and electrostatic forces in a water medium, van Oss et al. (C. J. van Oss, 1995) proposed another non-DLVO and polar force—the Lewis acid-base ("AB") force.

The AB force is related to hydration, both its interaction type and magnitude depend on the surface hydrophilicity of polar substances in a polar medium such as water. Thus, two hydrophobic surfaces approaching each other in water will exhibit an attraction, while two hydrophilic surfaces will repel each other. The magnitude of attraction or repulsion depends on the extent of hydrophilicity or hydrophobicity of the surfaces (e.g., mPES membrane and polystyrene particle in exemplary embodiments of the present technology). Typically, polar substances immersed in water are surrounded by two layers of water (~6 Å), and these water layers and their order determines the short separation range (~3 nm) in which AB force is playing a role. However, the AB force in this short range can have a magnitude much higher than that of the other two classic forces, van der Waals force and electrostatic force, making it essential in considering the particle-membrane interactions at short distances.

In xDLVO theory, the interaction between a particle and the membrane is divided into polar and apolar components apart from the electrostatic force. Both the polar and apolar components are directly related to the classic surface tension component of liquid medium where the interaction takes places. Specifically, the apolar component of the interaction is entirely equivalent to the Lifshitz-van der Waals ("LW") force ($\gamma^{LW}$), while the polar component ($\gamma^{AB}$) comprises electron-acceptor ($\gamma^+$) and electron-donor interaction ($\gamma^-$) parameters, the surface tension of the polar medium (e.g., water in some embodiments of the present technology) is written as the sum of $\gamma^{LW}$ and $\gamma^{AB}$.

The following equation describes the interaction energy of the xDLVO theory between two infinite planes as the sum of Lifshitz van der Waals ("LW"), electrostatic ("EL") and Lewis acid-base ("AB") energy:

$$U^{xDLVO}_{plm}(D) = U^{EL}_{plm}(D) + U^{LW}_{plm}(D) + U^{AB}_{plm}(D) \quad (1)$$

where D is the separation distance. As the separation distance increases, the interaction free energy of the AB force decays exponentially on the basis of a maximum energy obtained at the minimum equilibrium cutoff, which in xDLVO theory is assigned as $y_0 = 0.157 \pm 0.009$ nm.

Combining Eq. 1 with Derjaguin's technique to convert the free interaction energy between two infinite planes into that between spherical particles and membranes, the AB component of interaction energy is expressed as:

$$U_{plm}^{AB}(D) = 2\pi R \lambda \Delta G_{y_0}^{AB} \exp\left[\frac{y_0 - D}{\lambda}\right] \tag{2}$$

where $\lambda$ is the characteristic decay length of AB force in water and is set as $\lambda = 0.6$ nm, $\Delta G_{y_0}^{AB}$ is the free interaction energy at the equilibrium cutoff separation and, in some embodiments, is extracted from fitting the theory to experimental force curves. With this free energy expression, the AB force is obtained from the derivative of free energy by the separation distance as:

$$F_{plm}^{AB} = -\frac{\partial U_{plm}^{AB}}{\partial D} = 2\pi R \Delta G_{y_0}^{AB} \exp\left[\frac{y_0 - D}{\lambda}\right] \tag{3}$$

In some embodiments, the van der Waals and electrostatic forces are expressed the same as that in DLVO theory:

$$F_{plm}^{LW} = -\frac{AR}{6D^2} \tag{4}$$

$$F_{plm}^{EL} = \pi \varepsilon_r \varepsilon_0 R(\psi_1^2 + \psi_2^2)\frac{(2\kappa)}{\exp 2\kappa D - 1} \tag{5}$$

where A is the Hamaker constant in the macromolecular van der Waals interaction and will also be extracted from fits to experimental force curves, $\varepsilon_0$ is the permittivity of vacuum, Er is the relative dielectric permittivity of water, $\psi_1$ is the surface potential of particle, and $\psi_2$ is that of membrane (both obtained from independent measurements), K is the inverse Debye length that is given by:

$$\frac{1}{\kappa} = \sqrt{\frac{\varepsilon_r \varepsilon_0 k_B T}{2n_i v^2 e^2}} \tag{6}$$

where $\kappa_B$ is the Boltzmann constant as $\kappa_B = 1.38064852 \times 10^{-23}$ m$^2$ kg s$^{-2}$ K$^{-1}$, T is the temperate as K, $n_i$ is the number of ions volumetric density (/m3), v is the valence of ions, and e is the electron charge.

In some embodiments, intermolecular force curves obtained with AFM-force mapping were used for xDLVO theory fitting. Combining Eqs. 3, 4, and 5 gives the general expression of xDLVO theory for describing intermolecular force. There are 5 independent parameters apart from the separation distance D: two key parameters the Hamaker constant A and the free energy of the AB force at equilibrium cutoff ($\Delta G_{y_0}^{AB}$) are extracted through fitting experimental force curves with the xDLVO theory. The two surface potentials of the particle and the membrane are experimentally measured, and Debye length is calculated from Eq. 6. All parameters are then used for thermodynamic requirements in the 3D simulations discussed herein.

Simulation: MFiX-DEM. The discrete element method ("DEM") is mainly used for simulating multiphase flow. Under the MFiX-DEM structure, the fluid phase and particle phase are represented using Eulerian and Lagrangian descriptions, respectively. For the Eulerian description, fluid is set as a continuum phase, while particles in the Lagrangian description are discrete phases. One of the advantages of the DEM in the MFiX fluid solver is its accuracy since the simulation code is for computing the interaction between every single particle instead of the particle parcels, which is commonly used in other commercial Computational Fluid Dynamics ("CFD") software.

Numerical implementation of the fluid phase in MFiX-DEM is based on the Navier-Stokes equation, with an additional term originating from fluid-particle interaction. Without considering chemical reaction and heat transfer, the mass and momentum balance can be written as:

$$\frac{\partial(\varepsilon_e \rho_e)}{\partial t} + \nabla \cdot (\varepsilon_g \rho_g v_g) = 0 \tag{7}$$

and $$\frac{D}{Dt}(\varepsilon_g \rho_g v_g) = \nabla \cdot \overline{\overline{S_g}} + \varepsilon_g \rho_g g - \sum_{m=1}^{N} I_{gm} \tag{8}$$

respectively, where $\varepsilon_g$, $\rho_g$, and $v_g$ is the volume fraction, density, and volume-averaged velocity of the fluid phase, respectively. $\overline{\overline{S_g}}$ is the fluid-phase stress tensor due to fluid mechanics, $\Sigma_{m=1}^{M} I_{gm}$ is the sum of momentum transfer due to the particle-fluid interpolation. The fluid in most cases with MFiX is a gas, but the simulation with fluid as a liquid (e.g., water) has also proven successful.

The collision and drag force description of the particle phase obeys Newton's law as:

$$\frac{dX^{(i)}(t)}{dt} = V^{(i)}(t) \tag{9}$$

$$m^{(i)}\frac{dV^{(i)}(t)}{dt} = F_T^{(i)} = m^{(i)}g + F_d^{(i \in k, m)}(t) + F_c^{(i)}(t) \tag{10}$$

$$I^{(i)}\frac{d\omega^{(i)}(t)}{dt} = T^{(i)} \tag{11}$$

where i is the index of particles from 1 to N, $X^{(i)}(t)$ denotes the position of particle i at t, $V^{(i)}(t)$ and $\omega^{(i)}(t)$ is the corresponding particle linear and angular velocity, respectively, g is the gravitational acceleration, and $I^{(i)}$ is the moment of inertia. The particle gravity, drag force $F_d(t)$ (pressure and/or viscosity induced) and collision force $F_c^{(i)}$ (t) collectively constitute the total force $F_T^{(i)}$.

In some embodiments, a key part of the force analysis of particles is the collision (or contact) force $F_c^{(i)}(t)$. In the MFiX-DEM model, a spring-dashpot-based soft sphere model is used for explicit particle-particle collisions which evolves over time. The contact force is calculated as a function of physically realistic interaction laws using empirical spring stiffness, dissipation constant, and friction coefficient. The particle-wall interaction is treated in the same way as the particle-particle collision.

In some embodiments, the simulation was carried out on a 3D representation of a model spherical bead membrane 10, comprising a cluster of 3D spheres 12, as shown in FIGS. 7-8. In some embodiments, the spheres 12 each have a diameter of 200 μm with a 50 μm spacing, or gap, between adjacent spheres 12. The gaps between spheres 12 mimic "pores" where the particles can pass through. In some embodiments, this sphere structure was set-up with a no-slip boundary condition in the particle capture region 14 (lower orange region containing the spheres), which contains the particles flowing from the top particle release region 16 (upper yellow region that contains the total initial particles to be released) to the exit region 18 at atmospheric pressure at the bottom. At the top of the system (i.e. above the particle release region 16), constant inflow fluid rate and pressure were assigned. Mono-dispersed particles were generated at a fixed number as initial condition in the particle release region 16. Details on the model configuration in these exemplary simulations are summarized in Table 4 below.

TABLE 4

MFiX simulation setup details

| Fluid properties | | | |
| --- | --- | --- | --- |
| Top pressure (Pa) | $2.02 \times 10^5$ | Viscosity (Pa · s) | $8.9 \times 10^{-4}$ |
| Temperature (K) | 298 | Molecular weight (g/mol) | 18 |
| Particle properties | | | |
| Diameter (µm) | 20 | Density (kg/m$^3$) | 1000 |
| Particle-particle friction coefficient (—) | 0.1 | Particle-wall friction coefficient ((—)) | 0.1 |
| Particle-particle restitution coefficient ((—)) | 0.9 | Particle-wall restitution coefficient ((—)) | 0.9 |
| Normal spring constant (N/m) | 30 | Spring norm/tan ratio | 2/7 |
| Domain and mesh | | | |
| Width (µm) | 1640 | Cell count | 20 |
| Height (µm) | 1440 | Cell count | 21 |
| Thickness (µm) | 80 | Cell count | 1 |
| DEM setup | | | |
| Hamaker Constant (p-p$^a$) (J) | Varies | Hamaker Constant (p-w$^b$) (J) | Varies |
| Outer cutoff (nm) | 10 | Outer cutoff (nm) | 10 |
| Inner cutoff (nm) | 1 | Inner cutoff (nm) | 1 |
| Asperity (nm) | 0.1 | | |

$^a$Particle-particle interaction.
$^b$Particle-wall interaction.

In some embodiments, in incorporating the xDLVO expression into the simulation program to investigate the effect of the intermolecular forces (thermodynamics) on particle capture and trajectories, the adhesion mode in MFiX was checked and switched as van der Waals force, two related source code files were modified: calc_collision_wall-_mod.f (for particle-wall interaction) and calc_force_dem.f (for particle-particle interaction).

Accordingly, embodiments of the present technology are directed to a 3D simulation protocol to understand the effect of thermodynamic factors, such as the intermolecular interactions between streptavidin-coated particles and poly (ether sulfone) membranes, on membrane particle capture. The variation of thermodynamics (i.e. the short-term attractive force) was achieved using different fluid medium conditions (pH and salt concentrations) and quantified using xDLVO theory. In some embodiments, a sphere-like membrane, such as a model bead structure, was constructed to avoid disturbances of particle capture by the membrane structure. Finally, with the hydrodynamics factors kept constant, the changes in short-term attractive forces and particle capture efficiencies from the simulations qualitatively correlated, thus confirming the efficacy of the model. In some embodiments, different hydrodynamics factors (e.g., approaching velocity, transmembrane pressure, and initial particle volume fraction/number) were varied to collectively evaluate how control parameters, compared with structural variations as the primary independent variable, impact the particle capture within membrane.

Figure 9:
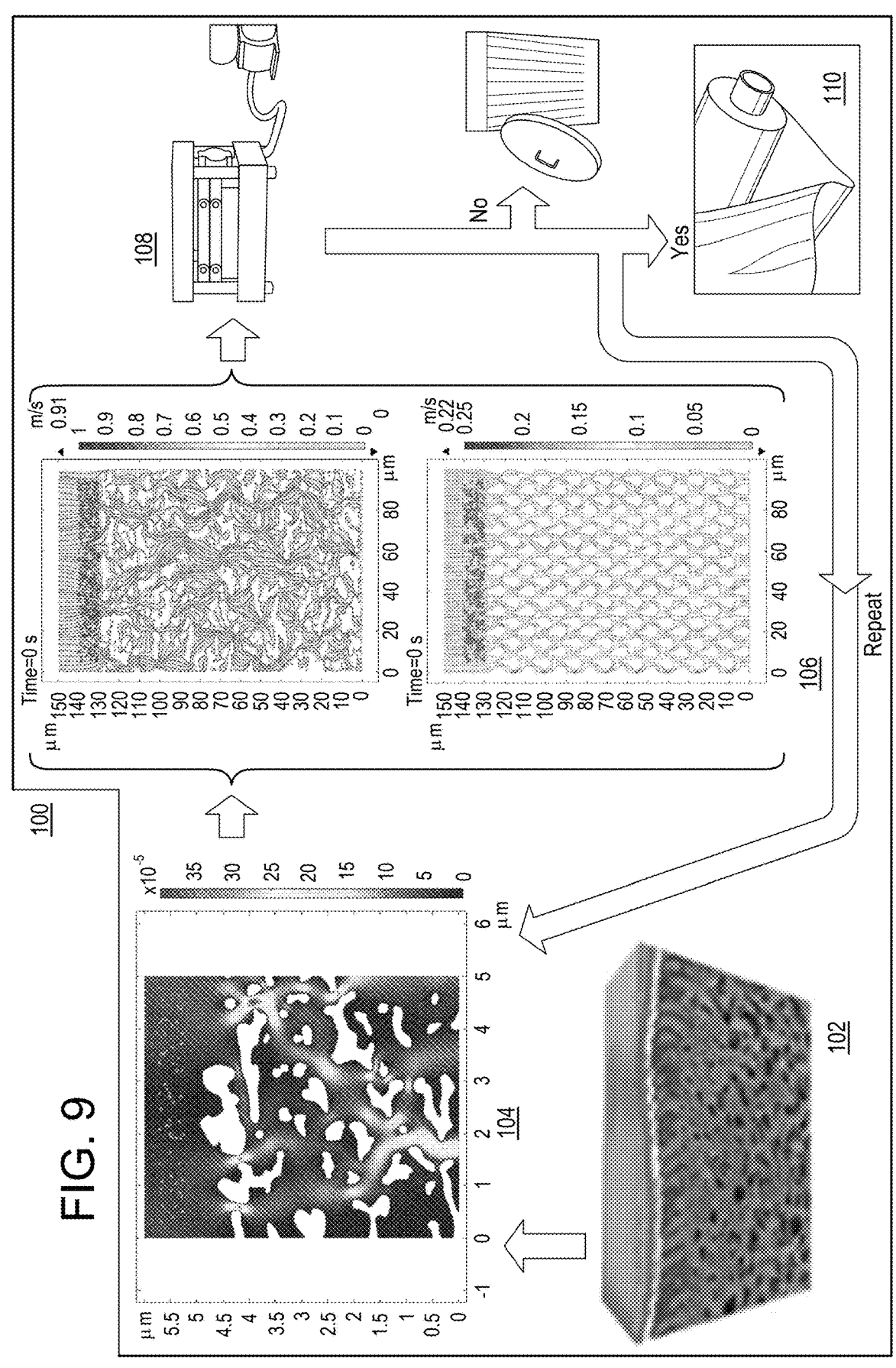
FIG. 9 is a flowchart of a method of directed evolution for developing a membrane according to an exemplary embodiment of the present technology.

FIG. 9 is a flowchart showing a method of directed evolution for membrane development 100 according to an exemplary embodiment of the present technology. At step 102, an initial membrane, such as any commercially available membrane, is provided. At step 104, the initial membrane is reproduced in silico. At step 106, the in-silico membrane is modified, or mutated, into an experimental membrane and the simulations discussed above are performed on the experimental membrane. In some embodiments, the experimental membrane is the spherical bead membrane 10 discussed above. At step 108, the simulation results are analyzed to determine if the experimental membrane is sufficiently optimized for a desired/intended purpose. If the experimental membrane is not sufficiently optimized, the experimental in silico membrane can be deleted and the method 100 repeats steps 104 to 108 to design an alternative experimental membrane for simulation testing. If the experimental membrane is sufficiently optimized, then a new evolved membrane is formed at step 110. In some embodiments, the evolved membrane is separate from the initial membrane. In some embodiments, the evolved membrane is formed by modifying the structure of the initial membrane to match the structure of the optimized experimental in-silico membrane.

Although the technology has been described and illustrated with respect to exemplary embodiments thereof, it should be understood by those skilled in the art that the foregoing and various other changes, omissions, and additions may be made therein and thereto, without parting from the spirit and scope of the present technology.

What is claimed is:
1. A method of estimating whether particle capture efficiencies of a membrane in one or more fluid media are within a desirable range, the membrane having a set of pore-related properties, the method comprising:

choosing a desirable range of particle capture efficiencies for a particle and the membrane in the one or more fluid media;

experimentally determining force-distance curves of the particle and the membrane in the one or more fluid media;

fitting the force-distance curves to a model based on an extended Derjaguin, Landau, Verwey, and Overbeek (xDLVO) theory to determine fitting parameters of the model for the particle and the membrane in the one or more fluid media;

calculating a Debye length for the one or more fluid media;

experimentally determining surface potentials of the particle and the membrane for the one or more fluid media conditions;

calculating particle capture efficiencies of the particle through the membrane for a plurality of given sets of hydrodynamic parameters for the one or more fluid media based in part on the fitting parameters, the Debye lengths, and the surface potentials;

determining whether the calculated particle capture efficiencies for each of the plurality of given sets of hydrodynamic parameters are within the desirable range of particle capture efficiencies.

2. The method of claim 1, wherein the one or more fluid media include differences in pH and/or salt concentration.

3. The method of claim 1, further comprising:

calculating particle capture efficiencies of the particle through a set of hypothetical membranes having the same fitting parameters of the model, wherein each hypothetical membrane of the set of hypothetical membranes has a different set of pore-related parameters; and determining whether the calculated particle capture efficiencies for each of the plurality of given sets of hydrodynamic parameters are within the desirable range of particle capture efficiencies for each hypothetical membrane of the set of hypothetical membranes.

4. The method of claim 3, wherein each hypothetical membrane of the set of hypothetical membranes comprises a spherical bead membrane having a particle release region, an exit region, a particle capture region positioned between the particle release region and the exit region, and a plurality of spheres positioned within the particle capture region.

5. The method of claim 4, wherein each of the plurality of spheres has a diameter of 200 µm and a 50 µm gap between each adjacent sphere.

6. The method of claim 4, wherein the spherical bead membrane has a width of 1640 µm, a height of 1440 µm, and a thickness of 80 µm.

7. The method of claim 1, wherein the particle has a diameter of 20 µm.

8. The method of claim 1, wherein the force-distance curves of the particle and the membrane are obtained using atomic force microscopy in the force mode.

9. The method of claim 1, wherein the particle comprises polystyrene coated with covalently attached streptavidin.

10. The method of claim 1, wherein the membrane comprises a modified polyethersulfone material.

11. The method of claim 1, wherein each given set of hydrodynamic parameters of the plurality of given sets of hydrodynamics factors comprises at least one of drag force, particle collisions, approach fluid velocity, transmembrane pressure, and initial particle volume fraction.

12. A method of selecting a membrane for separation of a first particle and a second particle, the method comprising:

choosing a desirable range of particle capture efficiencies for the first particle and the second particle in one or more fluid media for a given set of hydrodynamic parameters, the desirable range including one or more fluid media allowing separation of the first particle and the second particle;

experimentally determining force-distance curves of the first particle and the membrane for each fluid medium of the one or more fluid media;

experimentally determining force-distance curves of the second particle and the membrane for each fluid medium of the one or more fluid media;

fitting the force-distance curves of the first particle and the second particle to the extended Derjaguin, Landau, Verwey, and Overbeek (xDLVO) theory to determine fitting parameters of the model for each of the first and second particles for each fluid medium of the one or more fluid media;

calculating Debye lengths for each fluid medium of the one or more fluid media based on the ionic composition of each fluid medium;

experimentally determining surface potentials of the first and the second particles and the first membrane for each fluid medium of the one or more fluid media;

simulating flow of a collection of the first particles and of a collection of the second particles through the membrane for a given set of hydrodynamic parameters for each fluid medium of the one or more fluid media based in part on the fitting parameters, the Debye lengths, and the surface potentials, thereby obtaining simulated first particle flow properties and simulated second particle flow properties for each of the first and the second particles for each fluid medium of the one or more fluid media, the simulated first particle and second particle flow properties including first particle capture efficiencies and second particle capture efficiencies;

determining whether the calculated first particle capture efficiencies and second particle capture efficiencies are within the desirable range of the first and second particle capture efficiencies.

13. The method of claim 12, wherein the one or more fluid media include differences in pH and/or salt concentration.

14. The method of claim 12, further comprising:

calculating first particle and second particle capture efficiencies through a set of hypothetical membranes having the same fitting parameters of the model for each of the first and second particles, wherein each hypothetical membrane of the set of hypothetical membranes has a different set of pore-related parameters; and determining whether the calculated particle capture efficiencies for each of the plurality of given sets of hydrodynamic parameters are within the desirable range of first particle and second particle capture efficiencies for each hypothetical membrane of the set of hypothetical membranes.

15. The method of claim 14, wherein each hypothetical membrane of the set of hypothetical membranes comprises a spherical bead membrane having a particle release region, an exit region, a particle capture region positioned between the particle release region and the exit region, and a plurality of spheres positioned within the particle capture region.

16. The method of claim 15, wherein each of the plurality of spheres has a diameter of 200 μm and a 50 μm gap between each adjacent sphere.

17. The method of claim 15, wherein the spherical bead membrane has a width of 1640 μm, a height of 1440 μm, and a thickness of 80 μm.

18. The method of claim 12, wherein the force-distance curves of the first and second particles and the membrane are obtained using atomic force microscopy in the force mode.

19. The method of claim 12, wherein the membrane comprises a modified polyethersulfone material.

20. The method of claim 12, wherein each given set of hydrodynamic parameters of the plurality of given sets of hydrodynamics factors comprises at least one of drag force, particle collisions, approach fluid velocity, transmembrane pressure, and initial particle volume fraction.

\* \* \* \* \*